United States Patent
McCartie et al.

(10) Patent No.: US 10,498,789 B2
(45) Date of Patent: *Dec. 3, 2019

(54) DATA REPURPOSING

(71) Applicant: QUALCOMM Incorporated, San Diego, CA (US)

(72) Inventors: Jonathan Paul McCartie, San Diego, CA (US); George Allen Rothrock, San Diego, CA (US); Nicholas Andrew Glassman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,442

(22) Filed: May 6, 2019

(65) Prior Publication Data

US 2019/0260815 A1    Aug. 22, 2019

Related U.S. Application Data

(63) Continuation of application No. 12/014,942, filed on Jan. 16, 2008, now Pat. No. 10,326,812.

(51) Int. Cl.
*G06F 15/16* (2006.01)
*H04L 29/06* (2006.01)
(Continued)

(52) U.S. Cl.
CPC ........... *H04L 65/601* (2013.01); *H04N 7/163* (2013.01); *H04N 21/41407* (2013.01);
(Continued)

(58) Field of Classification Search
CPC . H04L 65/601; H04L 12/189; H04L 65/4076; H04L 67/28; H04L 67/2838;
(Continued)

(56) References Cited

U.S. PATENT DOCUMENTS 6,577,858 B1   6/2003  Gell
7,706,740 B2   4/2010  Collins et al.
(Continued)

FOREIGN PATENT DOCUMENTS

CN    1514578 A    7/2004
CN    1725227 A    1/2006
(Continued)

OTHER PUBLICATIONS

Arnold J.E., "Toward Collaborative Software Processes", Proceedings, Ninth International Software Process Workshop, Airlie, VA, USA, 1994, pp. 107-109.
(Continued)

*Primary Examiner* — Taylor A Elfervig
(74) *Attorney, Agent, or Firm* — Norton Rose Fulbright LLP

(57) ABSTRACT

A digital broadcast network is provided in which multiple original experiences powered by the same data is created. A server software intelligently handles delivery of data so that the data can be utilized by several different client-side applications at substantially the same time. Through filtering of large amounts of data and creation of a universal format, this data can be used by devices capable of receiving a digital broadcast stream.

39 Claims, 8 Drawing Sheets

(51) Int. Cl.
*H04N 21/45* (2011.01)
*H04N 7/16* (2011.01)
*H04N 21/414* (2011.01)
*H04N 21/422* (2011.01)
*H04N 21/466* (2011.01)
*H04N 21/4788* (2011.01)
H04L 29/08 (2006.01)
H04H 60/46 (2008.01)
H04L 12/18 (2006.01)
H04H 60/80 (2008.01)
H04W 8/00 (2009.01)

(52) U.S. Cl.
CPC ... *H04N 21/42202* (2013.01); *H04N 21/4532* (2013.01); *H04N 21/466* (2013.01); *H04N 21/4788* (2013.01); *H04H 60/46* (2013.01); *H04H 60/80* (2013.01); *H04L 12/189* (2013.01); *H04L 65/4076* (2013.01); *H04L 67/28* (2013.01); *H04L 67/2838* (2013.01); *H04W 8/005* (2013.01)

(58) Field of Classification Search
CPC ............. H04N 7/163; H04N 21/41407; H04N 21/42202; H04N 21/4532; H04N 21/466; H04N 21/4788; H04H 60/46; H04H 60/80; H04W 8/005
USPC ........................................................ 709/204
See application file for complete search history.

(56) References Cited

U.S. PATENT DOCUMENTS

| | | |
|---|---|---|
| 2002/0128028 A1 | 9/2002 | Stille et al. |
| 2002/0128029 A1 | 9/2002 | Nishikawa et al. |
| 2003/0099457 A1 | 5/2003 | Takahashi et al. |
| 2003/0114224 A1 | 6/2003 | Anttila et al. |
| 2003/0172108 A1 | 9/2003 | Paul et al. |
| 2003/0232318 A1 | 12/2003 | Altenhofen et al. |
| 2004/0046655 A1 | 3/2004 | Benes et al. |
| 2004/0082383 A1 | 4/2004 | Muncaster et al. |
| 2004/0235568 A1 | 11/2004 | Kim |
| 2004/0252185 A1 | 12/2004 | Vernon et al. |
| 2005/0080894 A1 | 4/2005 | Apostolopoulos et al. |
| 2005/0160270 A1 | 7/2005 | Goldberg et al. |
| 2005/0278411 A1 | 12/2005 | Nasu et al. |
| 2005/0286546 A1 | 12/2005 | Bassoli et al. |
| 2006/0161621 A1 | 7/2006 | Rosenberg |
| 2006/0173619 A1 | 8/2006 | Brant et al. |
| 2006/0190968 A1 | 8/2006 | Jung et al. |
| 2007/0096873 A1 | 5/2007 | Sadr |
| 2007/0299976 A1 | 12/2007 | Zafar et al. |
| 2008/0065675 A1 | 3/2008 | Bozich et al. |
| 2008/0095110 A1 | 4/2008 | Montojo et al. |
| 2008/0102817 A1 | 5/2008 | Shenassa et al. |
| 2008/0207115 A1 | 8/2008 | Lee et al. |
| 2008/0280603 A1 | 11/2008 | Rivera et al. |
| 2009/0182813 A1 | 7/2009 | McCartie et al. |

FOREIGN PATENT DOCUMENTS

| | | |
|---|---|---|
| CN | 1770725 A | 5/2006 |
| CN | 1852431 A | 10/2006 |
| GB | 2403631 | 1/2005 |
| JP | 2005166059 A | 6/2005 |
| JP | 2007274227 A | 10/2007 |
| WO | WO-2007025910 A1 | 3/2007 |
| WO | WO-07082190 | 7/2007 |

OTHER PUBLICATIONS

Cook C., et al., "A User Evaluation of Synchronous Collaborative Software Engineering Tools," 12th Asia-Pacific Software Engineering Conference (APSEC'05), Taipei, Taiwan, 2005, 6 Pages.
International Preliminary Report on Patentability—PCT/US2009/030838, International Search Authority—European Patent Office, dated Jun. 1, 2010.
International Search Report, PCT/US2009/030838, International Searching Authority, European Patent Office, dated Jun. 9, 2009.
Lang, M., et al., "A Tool to Support Collaborative Software Requirements Management", Requirements Engineering, 2001, 6, pp. 161-172, https://doi.org/10.1007/s007660170002.
Written Opinion, PCT/US2009/030838, International Searching Authority, European Patent Office, dated Jun. 9, 2009.

DATA REPURPOSING

CROSS-REFERENCE TO RELATED APPLICATIONS

This application is a continuation of co-pending, commonly assigned, U.S. patent application Ser. No. 12/014,942, entitled, "DATA REPURPOSING", filed on Jan. 16, 2008, the disclosure of which is hereby incorporated by reference herein in its entirety as if fully set forth below and for all applicable purposes.

BACKGROUND

Field

The following description relates generally to content distribution systems and more particularly to content delivery.

Background

A digital broadcast network is a one-way delivery method to client-side software located on a user device. Datacast services provide data over a digital broadcast network to be used by the client-side software. The data is used to provide a user-experience through the client software associated with the datacast service. The delivery method of the data is similar to that used by traditional linear services such as video and audio signals. Subsequently, all information is provided in a "first to last" stream that materially influences the timeliness of the user-experience.

To improve a user experience, new data should be included in order to increase the types and variations of possible interactions. However, increasing the amount of data multicast to the client degrades the overall user experience by slowing what should be a timely experience. In addition, limitations exist that preclude the increase of data throughput to the client beyond a reasonable point.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with creating new services that are powered by data already being delivered and devising and including server functionality needed to deliver the data correctly. This can create new user experiences as well as expand user experiences.

An aspect relates to a method for providing collaborative data repurposing. The method includes discovering other clients within close proximity. The method also includes identifying one or more data streams for rendering and collaborating with at least one of the other clients to create an aggregated rendering of content.

Another aspect relates to a device for rendering content. The device includes a computer platform having a memory and a processor. The memory includes a selection parameter. Also included is a user interface in communication with the computer platform. The device further includes an observation component that discovers other devices and a channel selector that identifies one or more data streams for rendering on the device. An association component that collaborates with the at least one of the other devices is also included in the device.

A further aspect relates to an apparatus for selectively rendering at least a subset of content. The apparatus includes a means for discovering other clients within close proximity. Also included is a means for identifying one or more data streams for rendering and a means for collaborating with at least one of the other clients to create an aggregated rendering of content.

Yet another aspect relates to a machine-readable medium having stored thereon machine-executable instructions for discovering devices within close proximity. The instructions are also for identifying one or more data streams for rendering and collaborating with at least one of the discovered devices to create an aggregated rendering of content.

In a wireless communication system, another aspect relates to an apparatus that includes a processor. The processor is configured to discover devices within close proximity and send a query to determine if the other clients can participate in a collaborative experience. The processor can further be configured to receive a response to the query, wherein the response is an acceptance or denial of participation. Further, the processor can be configured to identify one or more data streams for rendering and collaborate with at least one of the discovered devices to create an aggregated rendering of content.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
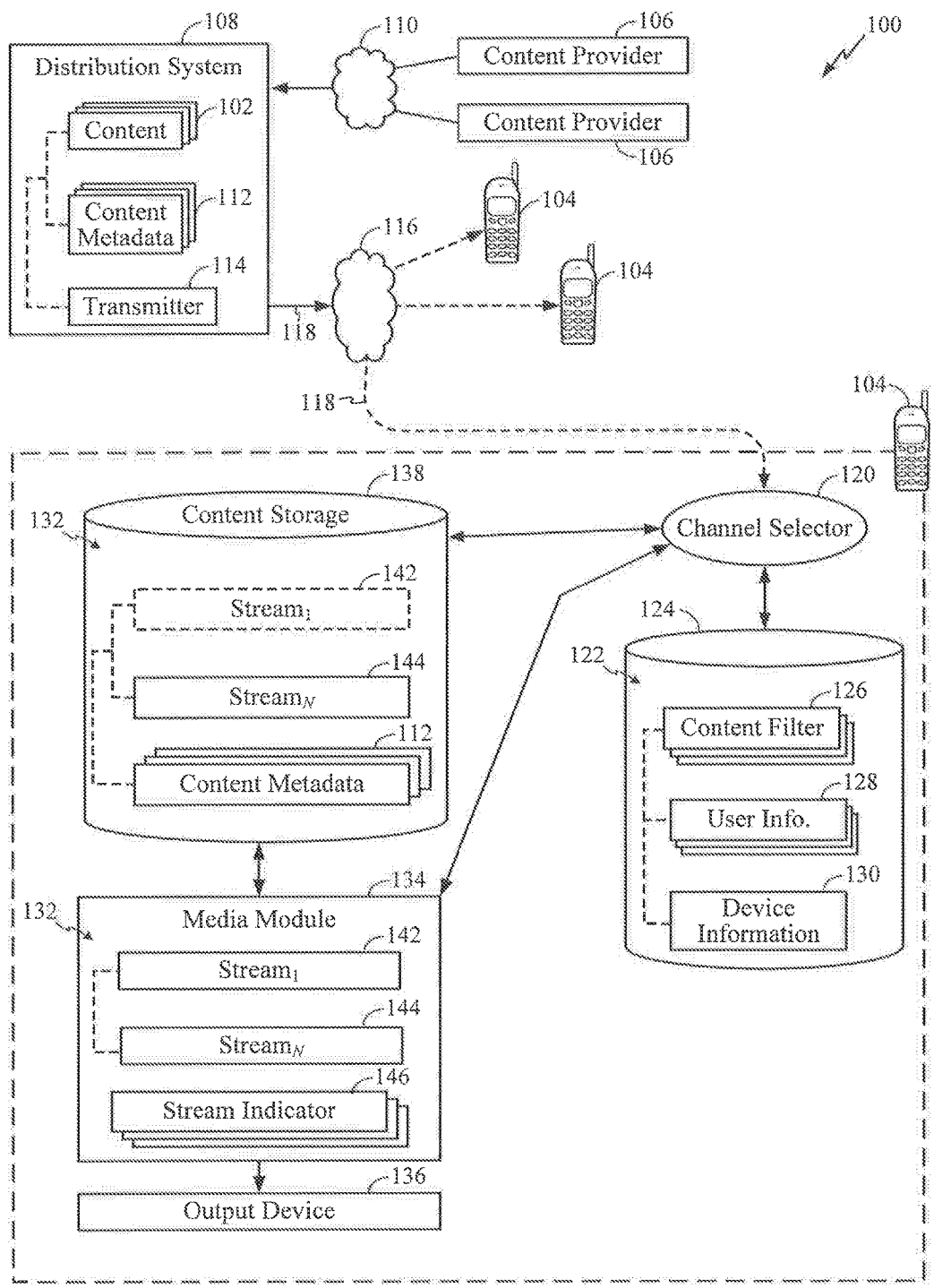
FIG. 1 illustrates a system that enables repurposing data on one or more wireless devices.

Various embodiments are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UF). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station ma be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a system 100 that enables repurposing of data on one or more wireless devices. System 100 can facilitate receiving data included within one or more multicast streams and using that data for dual purposes. For example, a game experience can be created from a news event by allowing participant players to predict an outcome of the news event. In another example, a multicast stream for an application can be used on the same wireless device to determine an outcome of a game (e.g., football, baseball, basketball). In accordance with some aspects, system 100 can allow devices to share functionality by providing video, data, and/or audio in multiple streams and using a subset of the data in each device according to user preferences and behavior.

In further detail, system 100 includes one or more content providers 106 operable to provide one more pieces of content 102 to distribution system 108, such as through a first network 110. Distribution system 108 is operable to deliver one or more streams of content 102, along with one or more content metadata 112 associated with each stream of content 102, to the one or more wireless devices 104. Such content can be delivered as individual streams of data, wherein a complete content set can include multiple streams of data (e.g, a single application of the data is divided into multiple streams). In accordance with some aspects, a single application can be divided into multiple streams, such as a different stream for each of video, data, and/or audio. For example, distribution system 108 may include a transmitter 114 and/or the second network 116, wherein transmitter 114 is operable to generate a one-to-many transmission 118 of content 102 and/or content metadata 112 for delivery to one or more wireless devices 104 through second network 116. The content 102 and/or content metadata 112 can be divided or portioned into multiple streams or multiple channels and one or more of the channels can be selectively received and combined (if more than one is selected) for presentation at a respective wireless device 104. In accordance with some aspects, at least one stream or channel is associated with content that can serve a dual purpose, such as providing player statistics and also providing a means for a user to participate in a gaming experience based in part on the player statistics.

Upon accessing transmission 118, each wireless device 104 is operable to execute a channel selector 120, which can be configured to determine selected one(s) of the one or more channels of content 102 in transmission 118 to download to wireless device 104 based on one or more selection parameters 122 within a selection database 124. Selection parameters 122 may include, but are not limited to, data such as one or more content filters 126 (e.g., relevant information contained in a stream, whether the stream can service a dual purpose), one or more data representing user information 128 (e.g. preferences, state, willingness to participate in a gaming experience), and/or one or more data representing device information 130 (e.g., capabilities, limitations, display size, audio functionality). Selection parameters 122 can be unique to, and/or customized for, each respective wireless device 104 and/or each respective user of each wireless device 104. As such, in some aspects, each wireless device 104 may download a different set of one or more streams of content 102 within the same transmission 118. Thus, in some aspects, one or more selection parameters 122 allow channel selector 120 to download one or more selected streams of content 132 of interest to a respective user of the respective wireless device 104 based on a match between one or more of the respective content metadata 112 and one or more of the selection parameters 122.

Further, for example, in aspects where selected content 132 comprises a real time or live content, channel selector 120 may forward selected content 132 to a media module 134 for presentation through an output device 136, in other aspects, for example, where selected content 132 comprises a non-real-time content, channel selector 120 may forward selected content 132 to be cached or saved in a content storage 138. In the non-real-time case, media module 134 is operable to access content storage 138 at any time to retrieve and cause a presentation through output device 136 of the saved selected content 132.

Output device 136, in combination with media module 134, is operable to generate selected content 132 as a program or presentation for consumption by a user of wireless device 104. Each program or presentation may comprise a combination of one or more streams of selected content 132 (labeled Stream$_1$ 142 through Stream$_N$ 144, where N is an integer) or might comprise a single stream of content. The streams of content 142, 144 can be associated with one or more of the content metadata 112 corresponding to each stream 142, 144. Further, for example, in some aspects, one or more streams 142, 144 of a respective program or presentation may include one or more associated stream indicators 146, each of which define a corresponding stream of content. Thus, each stream 142, 144 can provide a reference or association to a corresponding stream (e.g., an audio stream identifies its corresponding video stream). Providing reference information for a corresponding stream allows channel selector 120 to choose streams that are appropriate and which can enrich the user experience. In accordance with some aspects, the stream indicator 146 can provide information relating to a stream that can be used for a dual purpose (e.g., to obtain information and participate in a gaming experience).

Thus, system 100 provides each wireless device 104 the ability to independently choose one or more streams of selected content 132 from the one-to-many transmission 118 of a multitude of content 102 based on independently configured content caching functionality associated with each wireless device 104. Further, system 100 can provide each wireless device 104 the ability to independently choose one or more streams of content from among its respective set of one or more streams of selected content 132 for inclusion with another stream of selected content, based on independently configured content insertion functionality associated with each wireless device 104.

In accordance with some aspects, first network 110 and second network 116 provide respective communication links between the various components and/or entities of system 100. In some aspects, first network 110 and second network 116 may comprise independent networks, while in other aspects they may comprise inter-related networks. Generally, first network 110 and second network 116 each may comprise any one or any combination of one or more data networks and/or one or more communications networks. For example, in some aspects, first network 110 may comprise a public communications network, such as the Internet, and second network 116 may comprise a subscription based one-to-many network, such as a multicast network such as a Forward Link Only (FLO) network, including the MediaFLO™ System available from QUALCOMM, Incorporated, of San Diego, Calif. In other aspects, first network 110 and second network 116 may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network.

Further, examples of telephone networks that may be included in some aspects of first network 110 and/or second network 116 include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 2:
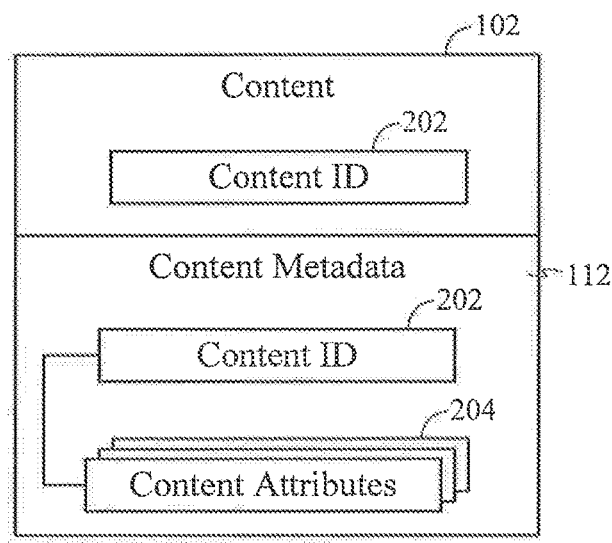
FIG. 2 illustrates a schematic diagram of an aspect of the content of FIG. 1.
Figure 3:
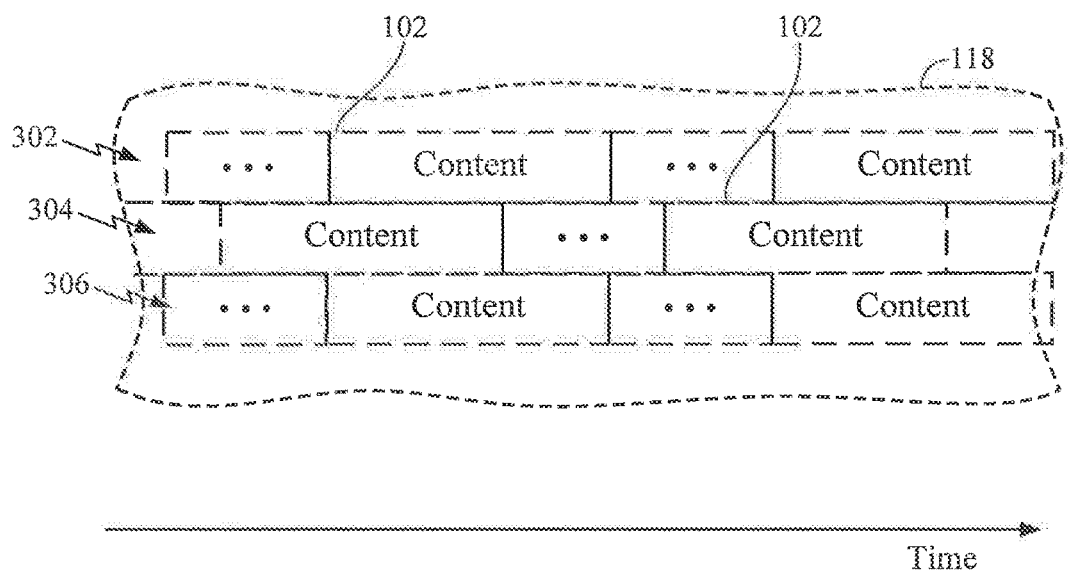
FIG. 3 illustrates a schematic diagram of an aspect of the transmission of a multitude of streams of the multitude of content of FIG. 1.

Referring to FIG. 2, illustrated is a schematic diagram of an aspect of the content of FIG. 1. Content 102 as used herein may comprise, but is not limited to, at least one of video, audio, multimedia content, real-time content, non-real-time content also referred to as "clips," scripts, programs, or any other type of data or object operable to be distributed to and executed or presented by wireless device 104, For example, content 102 may include one or any combination of subscribed to programming, ad hoc and/or on-demand received programming, and/or advertising or any other form of content added to, inserted within and/or presented simultaneously with or in place of other content. Additionally, for example, content 102 may comprise, but is not limited to, a television show, a video, a movie, a song, interactive data such as World Wide Web pages and links, etc. Further, content 102 may comprise a unique content identifier (ID) 202, such as one or any combination of a letter, a number, a name, a file name, a file path, etc. associated with the respective content.

Additionally, at least one of the multitude of content 102 is associated with one or more content metadata 112. For instance, one or more of the "content suppliers" associated with a respective one of the multitude of content 102 may define the respective content metadata 112, and associate the content metadata 112 with the respective content. As used herein, the term "content supplier" may include one or any combination of a content provider such as content provider 106, a content retailer, a billing and customer service provider, and a media distributor such as distribution system 108. Content metadata 112 comprises any data that describes and/or is associated with each respective piece of content 102. For example, content metadata 112 may comprise, but is not limited to, one or any combination of content ID 202 and one or more content attributes 204, such as a category, a name, a content length, a content type, associated stream indicator 146, a code, an identifier, a theme, a genre, an intended audience and/or market, a script, a content filter identifier, a cuing protocol parameter, a related audience and/or market, and/or any metadata relating to the corresponding content. One or more content metadata 112 may be separate from, attached to or embedded within the respective content 102. In some aspects, for example, when content 102 and content metadata 112 are separate, they each may comprise or point to the same content ID 202, for example, to enable the respective content metadata to be related to the respective content.

Referring to 3, illustrated is a schematic diagram of an aspect of the transmission of a multitude of streams of the multitude of content of FIG. 1, Transmission 118 may provide multiple streams or channels 302, 304, 306 of content 102 to each wireless device 104 (FIG. 1) for consumption by a respective end user. In some aspects, for example, each transmission 118 may comprise a one-to-many transmission in a Forward Link Only (FLO™) system, such as the MediaFLO™ system available from QUALCOMM, incorporated, of San Diego, Calif. In such a system, transmission 118 comprises a flow or a logical stream within a "multiplex," which is a set of flows available in a given geographical area. Further, each stream 302, 304, 306 carried by transmission 118 may comprise one or some combination of the multitude of content 102. Thus, transmission. 118 is able to deliver an entire content 102 utilizing multiple streams 302, 304, 306 at substantially the same time to allow a recipient of the multiple streams 302, 304, 306 to selectively choose one or more of the streams for rendering on a user device.

Figure 4:
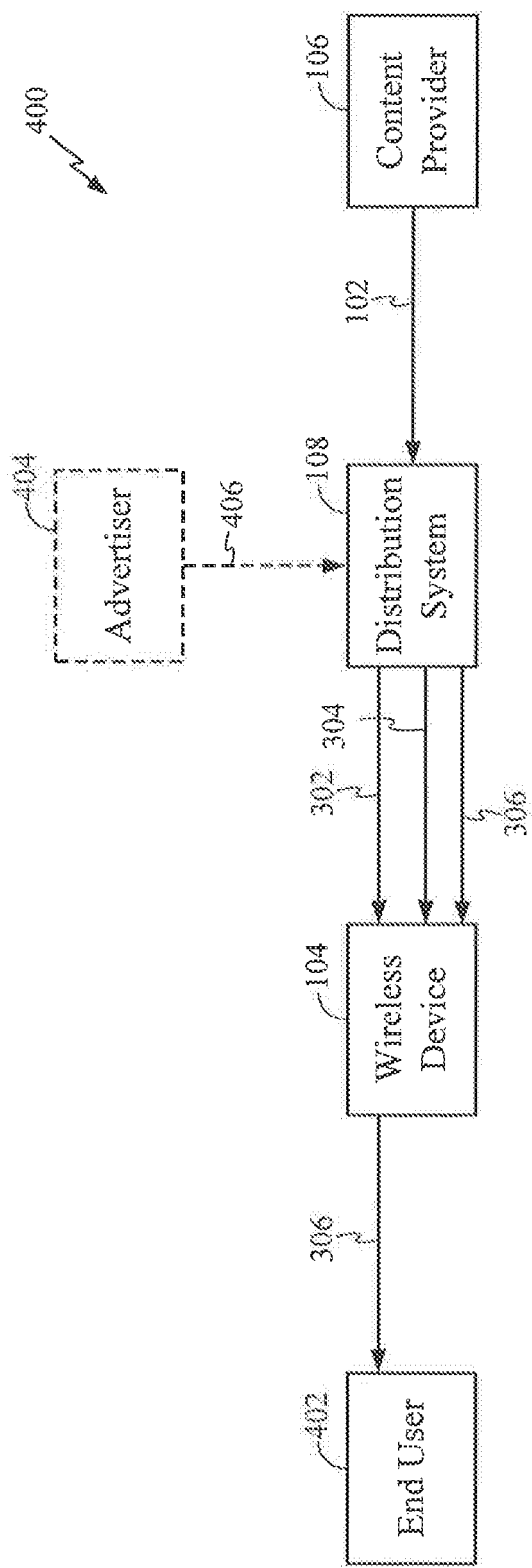
FIG. 4 illustrates a schematic diagram of an aspect of components, including an advertiser, of the system of FIG. 1.

Referring to FIG. 4, illustrated is a schematic diagram of an aspect of components, including an advertiser, of the system of FIG. 1. In some aspects, because the presentation of each stream 302, 304, 306 carried by transmission 118 may attract a large number of end users or consumers 402, system 100 may further include one or more advertisers 404 in communication with distribution system 108. Advertiser 404 comprises an entity desiring to present one more pieces of content 102 (FIG. 1) within a stream 406, in the form of one or more advertisements to selected (or all) end users 402. For example, in this aspect, a first stream 302 may comprise, but is not limited to, a video feed and a second stream 304 can comprise an audio stream and a third stream 306 may comprise, but is not limited to, an advertisement. One or more of the streams 302, 304, 306 can be presented to the end user 402, such as the third stream 306 comprising the advertisement. Although the other streams 302 and 304 can be received by the end user 402, such streams can be selectively ignored or disregarded if the streams do not conform to parameters associated with streams that should be relayed to the end user 402. For example, in each application there can be an advertising component. Instead of including this advertising component in the application, there can be a central stream that each separate application tunes into and includes. As such, users can selectively receive advertisements that might be of interest to the user while ignoring advertisements that the user is not interested in receiving.

Figure 5:
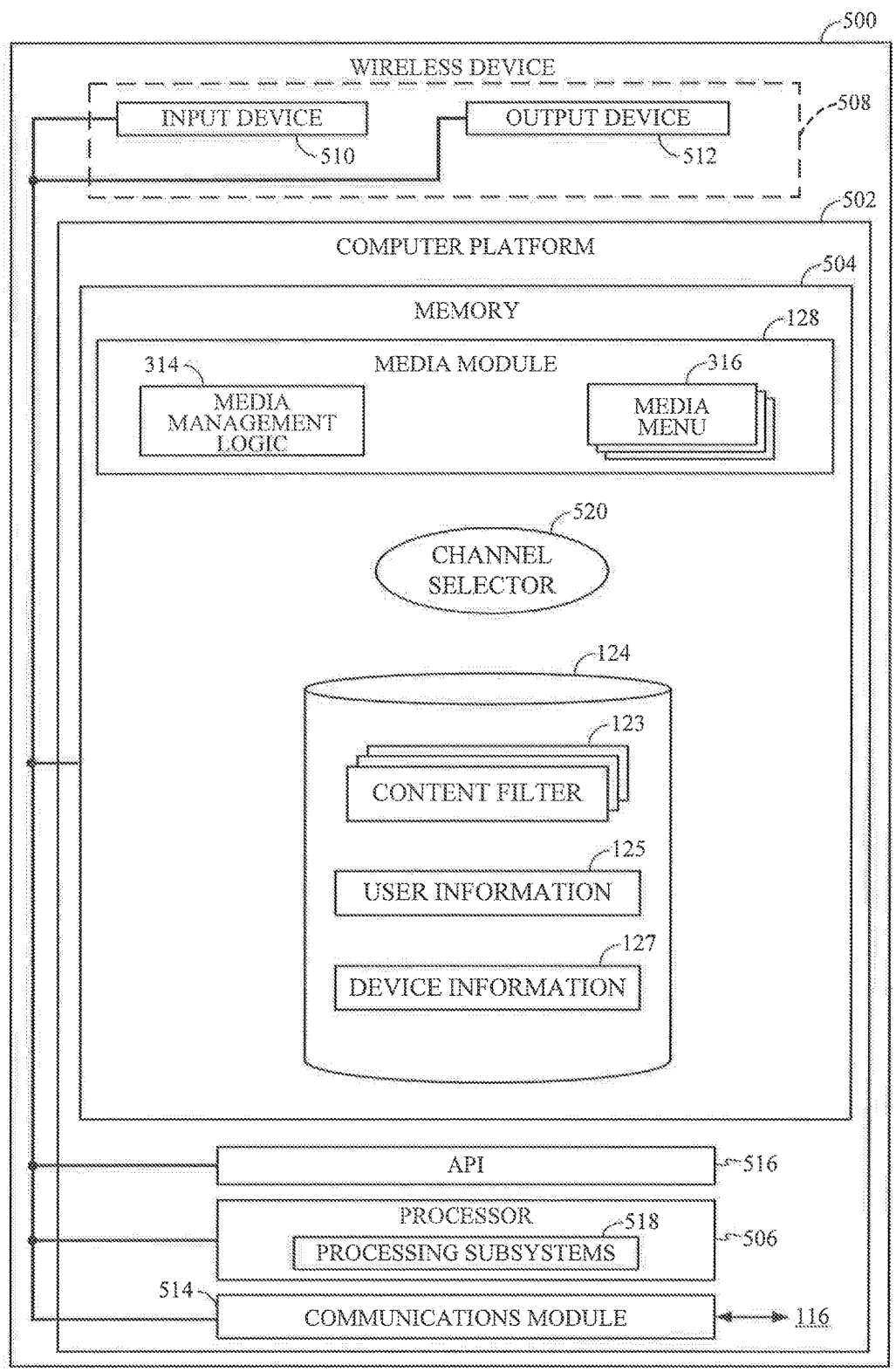
FIG. 5 illustrates a wireless device in accordance with the disclosed aspects.

FIG. 5 illustrates a wireless device 500 in accordance with the disclosed aspects. Wireless device 500 represents wireless device 104 of system 100 (FIG. 1) and is operable to access second network 116 in order to receive transmission 118 and/or to communicate with distribution system 108. Each wireless device 500 may comprise a computer platform 502 having a memory 504 operable to store data, logic and applications executable by a processor 506. A user may interact with wireless device 500 and its resident applications through one or more user interfaces 508, which may include one or more input devices 510 and one or more output devices 512. Additionally, wireless device 500 may exchange communications with external devices and/or networks through a communications module 514.

It should be noted that although wireless devices 500 may be illustrated as cellular telephones, any number and combination of types of wireless devices 500 may be included in system 100 of FIG. 1, For example, wireless device 500 may include, but is not limited to, a cellular telephone, a Personal Digital Assistant (PDA) a laptop computer, a two-way pager, a portable gaming device, a portable music device, or any type of computerized, wireless device. The disclosed aspects can accordingly be performed on any form of wireless device or computer module, including a wired or wireless communication portal, including without limitation, wireless modems, PCMCIA cards, access terminals, personal computers, telephones, or any combination or sub-combination thereof.

Computer platform 502 is operable to transmit data across a network, such as first network 110 (FIG. 1) and/or second network 116 (FIG. 1), and is operable to receive and execute routines and applications and optionally display data generated within wireless device 500 or received from any network device or other computer device connected to the network or connected to wireless device 500. Computer platform 502 may be embodied in, for example, one or any combination of hardware, firmware, software, data and executable instructions.

Memory 504 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 504 may include one or more of any secondary or tertiary storage device, such as magnetic media, optical media, tape, or soft or hard disk, including removable memory mechanisms.

Further, processor 502 may be one or more of an application-specific, integrated circuit ("ASIC"), a chipset, a processor, a logic circuit, and any other data processing device. In some aspects, processor 504, or other processor such as an ASIC, may execute an application programming interface (API) layer 516 that interfaces with any resident programs stored in memory 504 of wireless device 500, API 516 is typically a runtime environment executing on the respective wireless device, One such runtime environment is Binary Runtime Environment for Wireless® (BREW®) software developed by QUALCOMM, Incorporated, of San Diego, Calif. Other runtime environments may be utilized that, for example, operate to control the execution of applications on wireless computing devices.

Additionally, processor 502 may include various processing subsystems 518 embodied in hardware, firmware, software, data, executable instructions and combinations thereof, which enable the functionality of wireless device 500 and the operability of wireless device on network 116 of FIG. 1. For example, processing subsystems 518 allow for initiating and maintaining communications, and exchanging data, with distribution system 108 and/or other networked devices. In aspects in which the wireless device 500 is defined as a cellular telephone, for example, processor 506 may additionally include one or a combination of processing subsystems 518, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 518 of processor 506 may include any subsystem components that interact with applications executing on computer platform 502 that enable the functionality described herein. For example, processing subsystems 518 may include any subsystem components that receive data reads and data writes from API 516 on behalf of channel selector 520.

Further, communications module 514 may be embodied in hardware, firmware, software, data, executable instructions and combinations thereof, and is operable to enable communications among the various components of wireless device 500, as well as between wireless device 104 and first network 110 and/or second network 116. For example, in cellular telephone aspects, communication module 514 may include the requisite hardware, firmware, software, data, executable instructions and combinations thereof, including transmit and receive chain components for establishing a wireless communication connection.

Further, for example, communication module 514 is operable to receive the plurality of content 102 and the associated respective one or more content metadata 112, if any, from distribution system 108 and forward them to channel selector 520 or provide channel selector 520 with access to them. Similarly, for example, communication module 514 is operable to receive the one or more selection parameters 122 and either forward them to channel selector 520 or provide channel selector 520 with access to them. Subsequently, for example, communications module 514 is operable to forward selected content 126, respectively, to other device components for further processing.

Additionally, one or more input devices 510 for generating inputs into wireless device, and one or more output devices 512 for generating information for consumption by the user of the wireless device are provided. For example, input device 510 may include a mechanism such as a key or keyboard, a navigation mechanism, a mouse, a touch-screen display, a microphone in association with a voice recognition module, etc. In certain aspects, input device 510 provides an interface for receiving user input, such as to activate or interact with an application or module on the wireless device. Further, for example, output device 512 may include a display, an audio speaker, a haptic feedback mechanism, etc. Further, user interface 508 may comprise one or any combination of input devices 510 and/or output devices 512.

Figure 6:
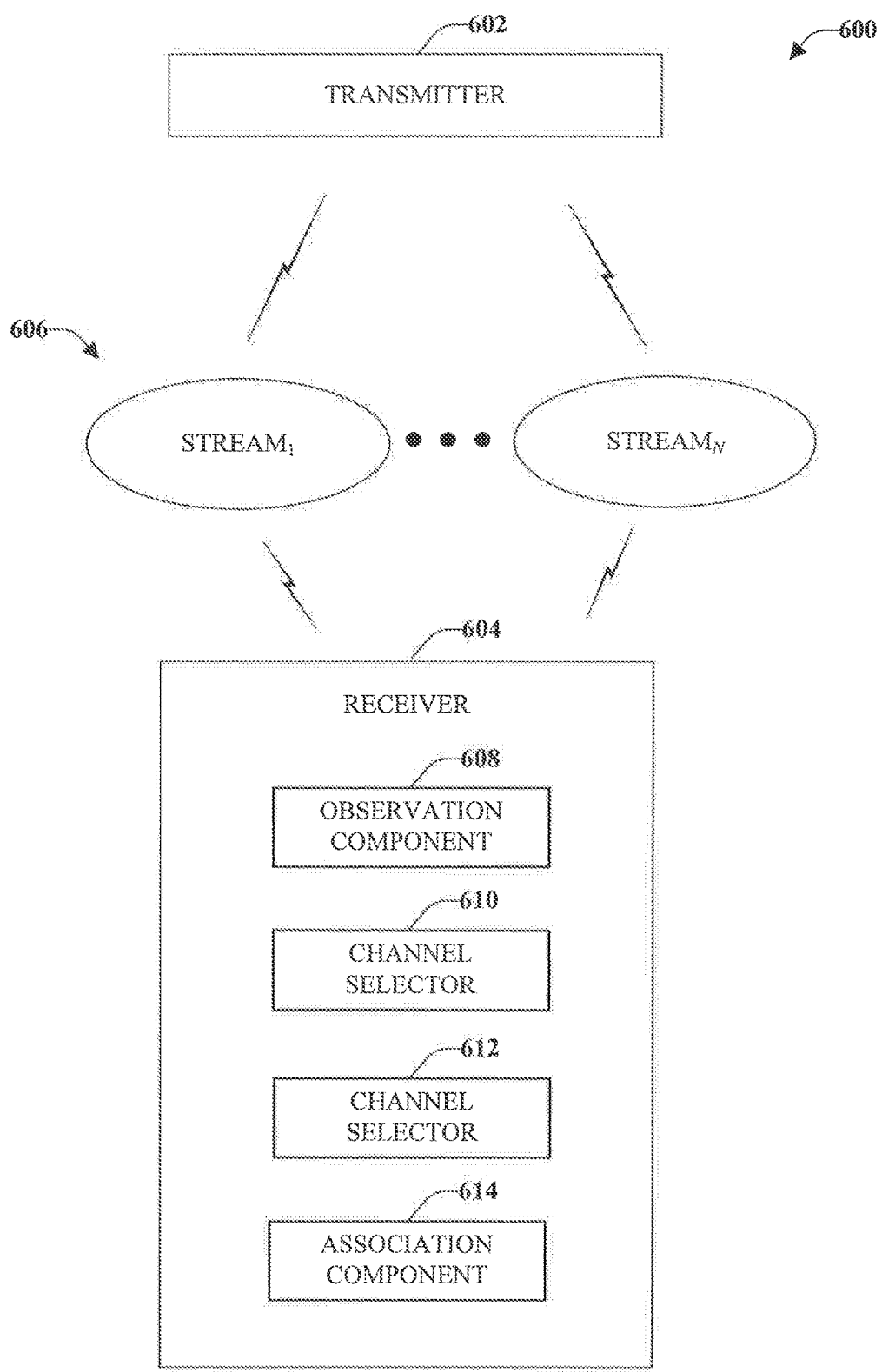
FIG. 6 illustrates a block diagram of an example system for facilitating data repurposing.

With reference now to FIG. 6, illustrated is a block diagram of an example system 600 for facilitating data repurposing. System 600 can be configured to receive multicast streams of data and utilize one or more streams for dual purposes. Additionally or alternatively, system 600 can facilitate collaboration between two or more client devices to enhance a user experience.

In further detail, system 600 includes a transmitter 602 that is in wireless communication with receiver 604. Transmitter 602 can be configured to divide or parse data into multiple streams in a predetermined manner. For example, each stream can include video, data, and/or audio relating to an application. Transmitter 602 can also include information within each of the multiple streams that identifies the type of data, information contained therein, information relating to associated streams and/or other information that can be used by receiver 604 to determine whether to accept or ignore a particular stream. As illustrated, transmitter 602 can send multiple streams, labeled Stream$_1$ through Stream$_N$, where N is an integer. The multiple streams are referred to collectively as streams 606.

Receiver 604 includes an observation component 608 that can be configured to discover and communicate with other devices (e.g., receivers) within a geographic area. Observation component 608 can be configured to monitor devices within an area, such as by information transmitted by the devices or by sending periodic requests to neighboring devices. Such requests can include a query asking whether the users of such devices are willing to participate in collaboration, such as a gaming experience. Receiver 604 can also be configured to receive such requests, through observation component 608. If a device (or receiver 604) is willing to participate, a communication can be sent to the requesting device. If a device (or receiver 604) is unwilling to participate, a denial can be sent and/or further communications from the requesting device can be ignored.

In accordance with some aspects, observation component 608 can automatically send an acceptance or a denial based on user preferences previously received. For example, a user might desire to communicate and participate with other users to share a similar gaming experience. The user can set particular settings by interacting with an interface component 610. The settings can be used so that as other devices send a request for others to participate, observation component 608 automatically discovers the devices and accepts (or denies) the invitations. The user can change the preference settings, depending on a current condition (e.g., user cannot be bothered for a set amount of time, user is currently using the device and is unavailable) or based on other factors that might be unique for each user.

Receiver 604 also includes a channel selector 612 that can be configured to identify one or more data streams for rendering on receiver. Such rendering can be in any readily perceivable format (e.g., visual, audio). The data streams can include information that can be utilized for dual purposes and can be selected based on one or more of the dual purposes. For example, information on a stream can include baseball player statistics. In addition to providing the user of receiver 604 information relating to player statistics the streams also provide the ability to use the information to interact in a collaborative environment within a gaming experience with one or more other users. The information within the data stream can include tags or other indicators that trigger channel selector 612 so that the information, if desired, can be used for the dual purpose gaming experience.

If the user desires to participate in a gaming experience with other users, a association component 614 can be configured to collaborate with one or more other devices that accepted the invitation to participate. The devices, through respective association components, can create an aggregated rendering of content. Each device can receive certain data streams and perform interactive gaming, wherein the users of each device compete against each other or perform other collaborative actions. In accordance with some aspects, a first group of users, through respective devices, can compete against a second group of users, through respective devices, remotely. Thus, collaboration can include two or more users performing interactive gaming.

Additionally or alternatively, channel selector 612 accepts one or more streams based on the type of information within the stream, such as video, data, audio and so forth. As such, a subset of the data is accepted at each device, which might be different data subsets, Such acceptance can be based on user preferences and/or user behavior, Therefore, the multicast steams can be rendered to each user differently as function of the device and/or as a function of preferences and/or behavior.

In accordance with another aspect, each device, through respective channel selectors 612 can receive certain channels of information. This can be similar to a game where participants receive different views and different audio feeds. Although each participant has a different experience, the participants are working as a collaborative unit to share a gaming experience, Thus, different users can have different experiences although they are using the same or different data streams, which are provided to each user separately through the multicast streams.

Figure 7:
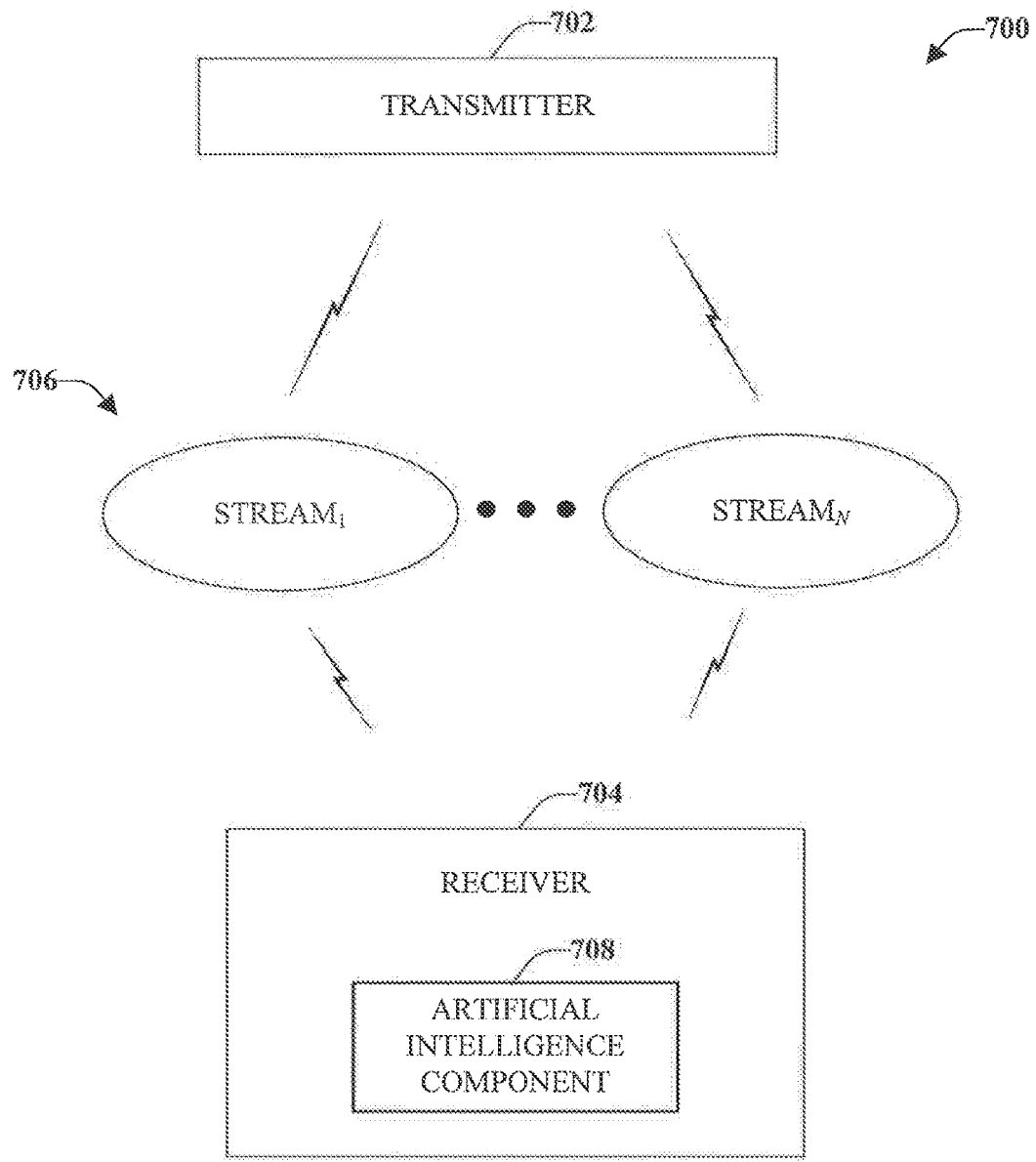
FIG. 7 illustrates an example system that utilizes artificial intelligence to automate one or more aspects.

FIG. 7 illustrates an example system 700 that utilizes artificial intelligence to automate one or more aspects. System 700 facilitates receipt of one or more multicast streams of data and uses the data contained in each stream for multiple purposes. By providing streams that can be used for multiple purposes, system 700 can facilitate higher responsiveness because each purpose does not require receipt of its own set of data. The data within the streams does not change, however, the data can be used to create multiple experiences.

System 700 includes a transmitter 702 in wireless communication with receiver 704, Transmitter 702 can transmit multicast streams of data 706 and receiver 704 can selectively accept and combine one or more of those streams 706 for presentation to a user. Receiver 704 can employ artificial intelligence (AI), which can be facilitated by AI component 708, as illustrated. The various embodiments (e.g., in connection with repurposing data from one or more streams of data) can employ various AI-based schemes (e.g., machine learning, rules-based techniques) for carrying out various aspects thereof. For example, a process for discovering other clients within close proximity can be facilitated through an automatic classifier system and process. In another example, based on a user state, AI component 708 can automatically infer that a query should be sent to determine if other users are willing to participate in a collaborative experience. In accordance with some aspects, AI component 708 can identify one or more data streams for rendering and can collaborate with at least one of the other users to create an aggregated rendering of content.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. In the case of data streams, for example, attributes can be information included with a particular stream (e.g., indicator, metadata) and the classes are categories or areas of interest (e.g., user preferences, device information, and so forth).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria which data can be reused for an experience that might be desired by a user and/or whether other users within a vicinity might be interested in collaborating on a game The criteria can include, but is not limited to, the type of data included in each stream, the content included in each stream, device information, user preferences, user state, and so forth.

Figure 8:
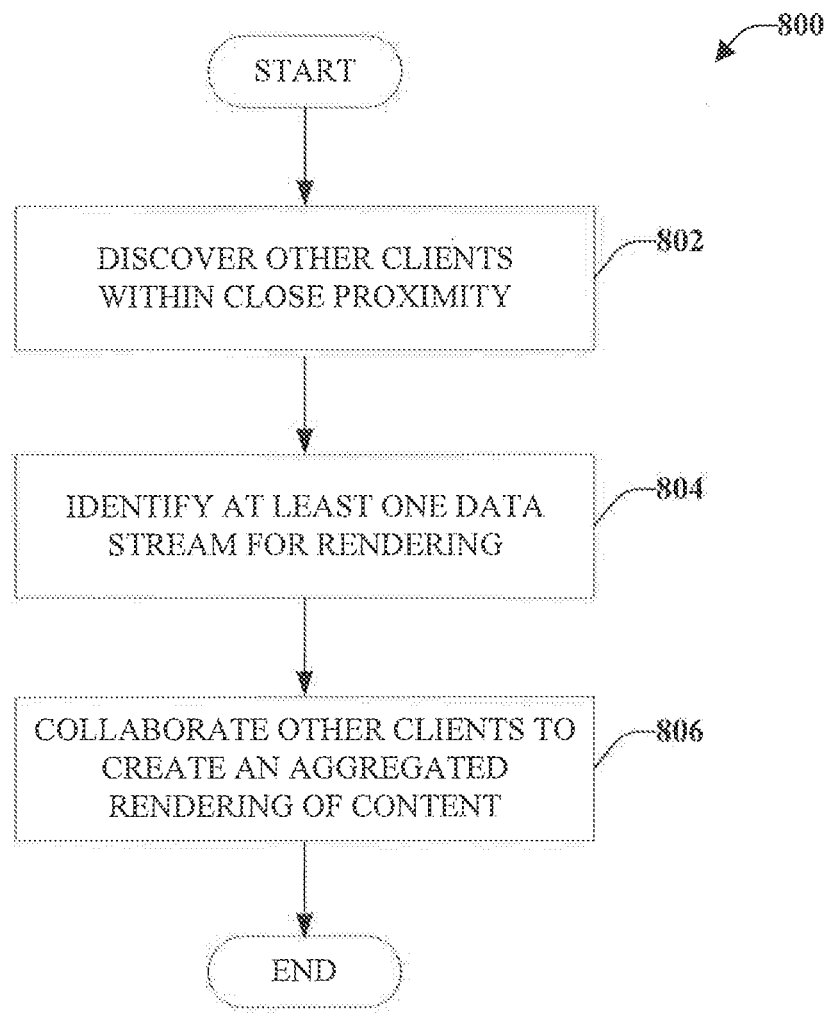
FIG. 8 illustrates a method for providing collaborative data repurposing.

FIG. 8 illustrates a method 800 for providing collaborative data repurposing. Method 800 can facilitate a multitude of clients within a particular geographic area (or remotely) sharing a similar experience based on information that can be received for at least two different purposes. Thus, each user device can obtain the same set (or different sets) of data and view the data, which can provide each user a different experience and/or a collaborative experience.

While, for purposes of simplicity of explanation, the methodology is shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodology described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

To facilitate users sharing a collaborative experience, method 800, starts at 802, when other devices or clients within close proximity are discovered. This discovery can include sending a request or query to neighboring devices to determine if users of such devices would like to participate in a collaborative event, such as a gaming situation. The neighboring devices can respond with the respective desires of the users of such devices. In accordance with some aspects, the neighboring devices, upon receiving the query, might send a notice to the user of the device advising the user of the query from the other device. For example, a query is sent to neighboring devices to determine if respective users of such devices would like to participate in a collaborative experience. The neighboring devices might automatically know whether the respective device user desires to collaborate or does not desire to collaborate, such as through device settings. In some situations, the user might request to be notified of such queries and a decision is made by the user at substantially the same time as receiving the query.

Once one or more other clients that are willing to participate are discovered, method 800 continues, at 804, when one or more data streams for rendering are identified. These data streams can be transmitted to client devices for one or more purposes such that a receiving device can obtain the data streams and use the information in the streams for a purpose different from the purpose the data streams are used by another receiving device. For example, one of the multiple datacast streams can include football player statistics, Based on those statistics, a game can be created where two or more users compete to predict how many touch downs a certain player will make or how many yards a certain player will advance the ball and so forth. In another example, a news event can be broadcast and the players compete to determine which player can correctly predict the outcome of the news event.

Thus, at 806, method collaborates with at least one of the other clients to create an aggregated rendering of content. For example, each client can receive certain channels of information and perform interactive gaming where they are competing against each other or where a first group of user devices is competing against a second group of user devices remotely. Collaboration can include a number of clients performing interactive gaming.

Figure 9:
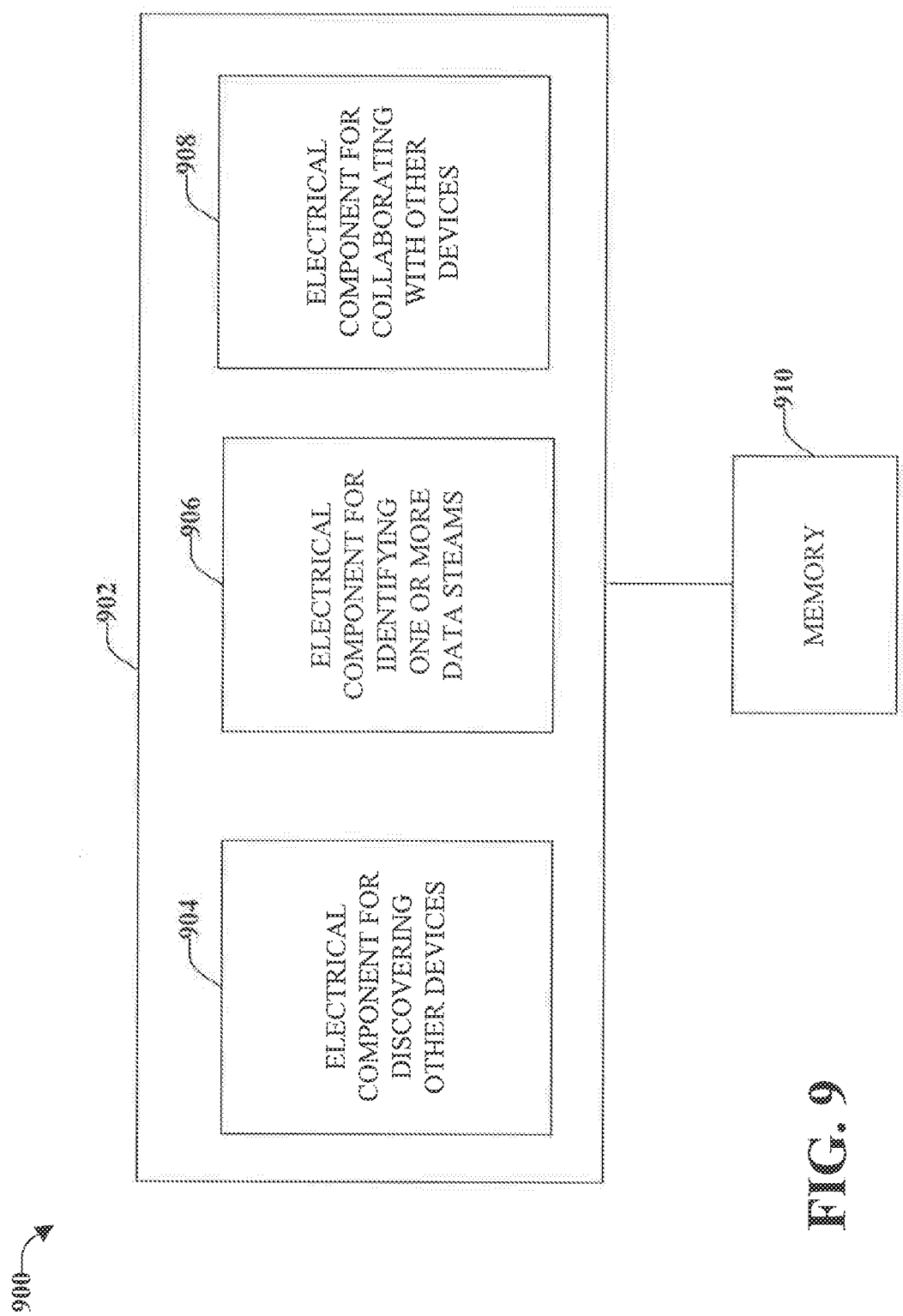
FIG. 9 illustrates an example system that facilitates reusing data received in one or more multicast streams.

With reference to FIG. 9, illustrated is an example system 900 that facilitates reusing data received in one or more multicast streams. System 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 may include an electrical component for discovering other devices within close proximity 904. For example, electrical component 904 can send a query to other devices asking if such devices would like to participate in a shared experience, such as a gaming experience. Logical grouping 902 can also include an electrical component for identifying one or more data streams for rendering 906. The one or more data streams can include information that serves a dual purpose. The data streams might be selected as a function of a user preference, a user behavior, or combinations thereof. For example, the user might be interested in a particular type of data (e.g., football instead of soccer). Electrical component 906 can automatically distinguish a stream that includes football information and select that stream for rendering on device. Further, logical grouping 902 can comprise an electrical component for collaborating with at least one of the other clients to create an aggregated rendering of content 908. The collaboration can be a shared gaming experience. The electrical component 908 can use data in the stream at substantially the same time as the at least one other client.

In accordance with some aspects, logical grouping 902 can include an electrical component for sending a query to determine if the other clients can participate in a collaborative experience and an electrical component for receiving a response to the query, wherein the response is an acceptance or denial of participation. Alternatively or additionally, logical grouping 902 can include an electrical component for identifying the one or more data streams based on a type, wherein the type is a video stream, a data stream, an audio stream, or combinations thereof and an electrical component for sharing functionality with the at least one other client based in part on type.

Additionally, system 900 can include a memory 910 that retains instructions for executing functions associated with electrical components 904, 906 and 908 or other components. While shown as being external to memory 910, it is to be understood that one or more of electrical components 904, 906 and 908 may exist within memory 910.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g, EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for providing collaborative data repurposing, comprising:
    discovering, at a first client device, other client devices within close proximity;
    identifying one or more data streams for rendering, wherein at least one of the one or more data streams includes data that serves a dual purpose of presenting information to a user on the first client device and enabling an interactive and collaborative experience between the first client device and one or more of the other client devices;
    rendering the at least one of the one or more data streams differently by the first client device than is rendered by at least one of the other client devices at substantially the same time, wherein the rendering by the first client device that is different than the rendering by the at least one of the other client devices is automatically selected by logic of the first client device inferring one or more preferences of the user of the first client device based, at least in part, on automatic processing of content in the at least one of the one or more data streams to identify whether the content is real-time content or non-real-time content; and collaborating with at least one of the other client devices to create an aggregated rendering of content when the at least one of the one or more data streams is rendered by the first client device for an interactive and collaborative experience.

2. The method of claim 1, wherein discovering the other client devices within close proximity comprises:
sending a query to determine if the other client devices can participate in a collaborative experience; and
receiving a response to the query, wherein the response is an acceptance or denial of participation.

3. The method of claim 1, further comprising:
identifying the one or more data streams based on a type, wherein the type is a video stream, a data stream, an audio stream, or combinations thereof; and
sharing functionality with the at least one other client devices based in part on the type.

4. The method of claim 1, wherein the collaborating with at least one of the other client devices comprises using data in the stream at substantially the same time as the at least one of the other client devices.

5. The method of claim 1, wherein the interactive and collaborative experience is a shared gaming experience where the client device and the at least one of the other client devices collaborating in the gaming experience receive different views for the shared gaming experience and the user of the first client device is competing with the user of the at least one of the other client devices.

6. The method of claim 1, wherein identifying one or more data streams for rendering is based in part on a user preference, a user behavior, or combinations thereof.

7. The method of claim 1, wherein the client device presents a different rendering of the content as a result of the interactive collaboration than the at least one of the other client devices.

8. The method of claim 1, wherein the information that serves a dual purpose comprises an indicator that triggers a channel selector so that the information that serves a dual purpose is used by the new service created on the client device.

9. A device for rendering content, comprising:
a computer platform having a memory and a processor, wherein the memory comprises a selection parameter;
a user interface in communication with the computer platform;
an observation component that discovers other devices;
a channel selector that identifies and selects one or more data streams for rendering on the device based on one or more selection parameters within a selection database, the one or more parameters including stream content, wherein at least one of the one or more data streams includes data that serves a dual purpose of presenting information to a user on the device and enabling an interactive and collaborative experience between the device and one or more of the other devices; and
an association component that interactively collaborates with the at least one of the other devices to produce collaborative content for rendering when the at least one of the one or more data streams is rendered by the association component for an interactive and collaborative experience, wherein the association component renders and uses the at least one of the one or more data streams differently at the device than is rendered and used at the at least one of the other devices at substantially the same time, wherein the rendering by the device that is different than the rendering by the at least one of the other devices is automatically selected by logic of the device inferring one or more preferences of the user of the device based, at least in part, on automatic processing of content in the at least one of the one or more data streams to identify whether the content is real-time content or non-real-time content.

10. The device of claim 9, wherein the observation component is configured to send an inquiry relating to sharing an experience to the at least one of the other devices.

11. The device of claim 9, wherein the channel selector identifies the one or more data streams based on a type and the association component shares functionality based in part on the type, wherein the type is a video stream, a data stream, an audio stream, or combinations thereof.

12. The device of claim 9, wherein the association component is configured to use data in the stream at substantially the same time as the at least one of the other devices.

13. The device of claim 9, wherein the interactive and collaborative experience is a shared gaming experience, wherein a user of the device for rendering content is competing with a user of the at least one of the other devices.

14. The device of claim 9, wherein the channel selector is configured to identify the one or more data streams for rendering based in part on a user preference, a user behavior, or combinations thereof.

15. The device of claim 9, wherein the device for rendering content presents a different rendering of the collaborative content as a result of the interactive collaboration than the at least one of the other devices.

16. A client apparatus for selectively rendering at least a subset of content, comprising:
means for discovering other client devices within close proximity;
means for identifying one or more data streams for rendering based on one or more selection parameters within a selection database, the one or more parameters including stream content, wherein at least one of the one or more data streams includes data that serves a dual purpose of presenting information to a user on the client apparatus and enabling an interactive and collaborative experience between the client apparatus and one or more of the other client devices;
means for rendering the at least one of the one or more data streams differently by the client apparatus than is rendered by at least one of the other client devices at substantially the same time, wherein the rendering by the client apparatus that is different than the rendering by the at least one of the other client devices is automatically selected by logic of the client apparatus inferring one or more preferences of the user of the client apparatus based, at least in part, on automatic processing of content in the at least one of the one or more data streams to identify whether the content is real-time content or non-real-time content; and
means for interactively collaborating with at least one of the other client devices to create an aggregated rendering of content when the at least one of the one or more data streams is rendered by the client apparatus for an interactive and collaborative experience.

17. The apparatus of claim 16, further comprising:
means for sending a query to determine if the other client devices can participate in a collaborative experience; and means for receiving a response to the query, wherein the response is an acceptance or denial of participation.

18. The apparatus of claim 16, further comprising:
means for identifying the one or more data streams based on a type, wherein the type is a video stream, a data stream, an audio stream, or combinations thereof; and
means for sharing functionality with the at least one other client devices based in part on type.

19. The apparatus of claim 16, wherein the means for interactively collaborating with at least one of the other clients uses data in the stream at substantially the same time as the at least one other client.

20. The apparatus of claim 16, wherein the interactive and collaborative experience is a shared gaming experience wherein a user of the client apparatus is competing with a user of the at least one of the other client devices.

21. The apparatus of claim 16, wherein the means for identifying one or more data streams for rendering identifies the streams based in part on a user preference, a user behavior, or combinations thereof.

22. The apparatus of claim 16, wherein the content rendering on the client apparatus is different than the content rendering on the at least one of the other clients.

23. A non-transitory machine-readable medium having stored thereon machine-executable instructions that when executed by a device are configured to perform operations comprising:
discovering other devices within close proximity;
identifying one or more data streams for rendering based on one or more selection parameters within a selection database, the one or more parameters including stream content, wherein at least one of the one or more data streams includes data that serves a dual purpose of presenting information to a user on the device and enabling an interactive and collaborative experience between the device and one or more of the other devices;
rendering the at least one of the one or more data streams differently by the device than is rendered by at least one of the other devices at substantially the same time, wherein the rendering by the device that is different than the rendering by the at least one of the other devices is automatically selected by logic of the device inferring one or more preferences of the user of the device based, at least in part, on automatic processing of content in the at least one of the one or more data streams to identify whether the content is real-time content or non-real-time content; and
collaborating interactively with at least one of the discovered devices to create an aggregated rendering of content when the at least one of the one or more data streams is rendered by the device for an interactive and collaborative experience.

24. The non-transitory machine-readable medium of claim 23, wherein the instructions are further configured to perform operations comprising:
transmitting a query to determine if the discovered devices can participate in a collaborative experience; and
receiving a response to the query, wherein the response is an acceptance or denial of participation.

25. The non-transitory machine-readable medium of claim 23, wherein the instructions are further configured to perform operations comprising:
identifying the one or more data streams based on a type, wherein the type is a video stream, a data stream, an audio stream, or combinations thereof; and
sharing functionality with the at least one of the discovered devices based in part on the type.

26. The non-transitory machine-readable medium of claim 23, wherein the instructions are further configured to perform operations comprising:
collaborating interactively with at least one of the discovered devices by using data in the stream at substantially the same time as the at least one of the discovered devices.

27. The non-transitory machine-readable medium of claim 23, wherein the interactive and collaborative experience is a shared gaming experience where the device and the at least one of the discovered devices collaborating in the gaming experience receive different views for the shared gaming experience and the user of the device is competing with the user of the at least one of the discovered devices.

28. The non-transitory machine-readable medium of claim 23, wherein identifying the one or more data streams for rendering is based in part on a user preference, a user behavior, or combinations thereof.

29. The non-transitory machine-readable medium of claim 23, wherein the content rendering on the device is different than the content rendering on the at least one of the discovered devices collaborated with to create the aggregated rendering of content.

30. In a wireless communication system, an apparatus comprising:
a processor configured to:
discover devices within close proximity;
send a query to determine if the discovered devices can participate in a collaborative experience;
receive a response to the query, wherein the response is an acceptance or denial of participation;
identify one or more data streams for rendering based on one or more selection parameters within a selection database, the one or more parameters including stream content, wherein at least one of the one or more data streams includes data that serves a dual purpose of presenting information to a user on the apparatus and enabling an interactive and collaborative experience between the apparatus and one or more of the discovered devices;
render the at least one of the one or more data streams differently than is rendered by at least one of the discovered devices at substantially the same time, wherein the rendering that is different than the rendering by the at least one of the discovered devices is automatically selected by logic of the apparatus inferring one or more preferences of the user of the apparatus based, at least in part, on automatic processing of content in the at least one of the one or more data streams to identify whether the content is real-time content or non-real-time content; and
interactively collaborate with at least one of the discovered devices to create an aggregated rendering of content when the at least one of the one or more data streams is rendered for an interactive and collaborative experience.

31. The apparatus of claim 30, wherein the processor is further configured to:
identify the one or more data streams based on a type, wherein the type is a video stream, a data stream, an audio stream, or combinations thereof; and
share functionality with the at least one of the discovered devices based in part on the type.

32. The apparatus of claim 30, wherein the processor is further configured to perform interactive collaborating with at least one of the discovered devices by using data in the stream at substantially the same time as the at least one of the discovered devices.

33. The apparatus of claim 30, wherein the interactive and collaborative experience is a shared gaming experience where the apparatus and the at least one of the discovered devices collaborating in the gaming experience receive different views for the shared gaming experience and the user of the apparatus is competing with the user of the at least one of the discovered devices.

34. The apparatus of claim 30, wherein the one or more data streams identified for rendering is based in part on a user preference, a user behavior, or combinations thereof.

35. The apparatus of claim 30, wherein the content rendering on the apparatus is different than the content rendering on the at least one of the discovered devices collaborated with to create the aggregated rendering of content.

36. The apparatus of claim 30, wherein a plurality of the discovering devices, the identifying one or more data stream and the interactively collaborating employ artificial intelligence comprising an automatic classifier system.

37. The apparatus of claim 30, wherein a plurality of the discovering devices, the identifying one or more data stream and the interactively collaborating employ artificial intelligence comprising a support vector machine.

38. The apparatus of claim 30, wherein a plurality of the discovering devices, the identifying one or more data stream and the interactively collaborating employ artificial intelligence comprising a classifier that is explicitly trained.

39. The apparatus of claim 30, wherein a plurality of the discovering devices, the identifying one or more data stream and the interactively collaborating employ artificial intelligence comprising a classifier that is implicitly trained.

* * * * *